United States Patent [19]

Vigurs

[11] 4,220,859
[45] Sep. 2, 1980

[54] INFRA RED RADIATION DETECTOR

[75] Inventor: John P. C. Vigurs, East Molesey, England

[73] Assignee: IM Electronics Limited, England

[21] Appl. No.: 939,845

[22] Filed: Sep. 5, 1978

[30] Foreign Application Priority Data

Mar. 23, 1978 [GB] United Kingdom ............... 11854/78

[51] Int. Cl.$^2$ ............................................... G01J 1/00
[52] U.S. Cl. ..................................... 250/353; 250/342
[58] Field of Search ............... 250/338, 340, 342, 353; 340/541, 565, 567

[56] References Cited

U.S. PATENT DOCUMENTS

| 3,751,664 | 8/1973 | Falbel .................................. 250/353 |
| 3,861,458 | 1/1975 | Ostrander et al. ............... 250/342 X |
| 4,009,392 | 2/1977 | Hanley ............................. 250/342 X |
| 4,081,680 | 3/1978 | Keller .................................... 250/342 |

Primary Examiner—Davis L. Willis
Attorney, Agent, or Firm—Basile, Weintraub & Hanlon

[57] ABSTRACT

A detector for detecting electromagnetic radiation within the infra red region of the electromagnetic spectrum comprising a pyro-electric transducer positioned so as to intercept electromagnetic radiation focussed by a converging reflector system wherein said converting reflector system is at least partially frusto-conical.

1 Claim, 2 Drawing Figures

INFRA RED RADIATION DETECTOR

The present invention relates to intruder alarms and more particularly to infra-red detectors for use in intruder alarms.

Pyro-electric transducers are known which produce an electrical output in response to a change in the intensity of incident infra-red radiation. These pyro-electric transducers have been used in infra-red detectors in intruder alarms since they are substantially insensitive to constant sources of infra-red radiation, but will readily respond to a changing infra-red source such as the entry of an intruder in a surveyed area. In order to enhance the change in infra-red energy incident upon the transducer as an intruder moves within an area of surveillance it has been known to introduce a grating in front of the detector and to position the transducer at the focal point of a faceted mirror system.

A disadvantage of such systems resided in the fact that the detector is not particularly sensitive to an infra-red source moving directly towards the detector. In this operating condition, a faceted mirror system fails to produce a modulation in the received signal and hence the sensitivity of the detector is greatly reduced.

It has also been proposed to replace the faceted mirror system by a lens made, for example, of germanium but this type of detector has the inherent disadvantage of high cost and a narrow field of detection.

With a view to mitigating at least some of the foregoing disadvantages, there is provided in accordance with the present invention a detector for detecting infra-red radiation which comprises a pyro-electric transducer positioned to intercept infra-red radiation reflected by a converging reflector system which is at last partially frusto-conical.

As the reflector system is circularly symmetrical, that is to say it forms a surface of revolution, there are no "blind" radial lines in the area of surveillance and a direct approach onto the detector from any direction will readily be detected.

The invention will now be described further, by way of example, with reference to the accompanying drawings, in which.

Figure 1:
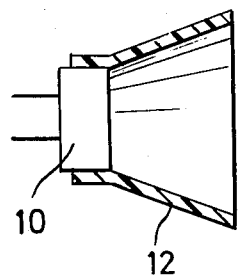
FIG. 1 shows an infra-red detector in accordance with the invention.

Referring to FIG. 1, an infra-red detector comprises a pyro-electric transducer 10 and may for example comprise the pyro-electric detector marketed as Model 406 marketed by Eltec Instruments Inc. The transducer 10 is positioned on the axis of a converging reflector 12 which is of frusto-conical form. It is to be noted that the reflector is not faceted in any way as in prior art constructions.

The reflector may conveniently be made by vacuum aluminizing a moulded plastics blank, the resulting reflector having a high reflectivity and low absorption to incident infra-red radiation.

Various conical angles have been experimented with and it has been found that with a conical angle less than 45° an improvement in the range is obtained as compared with the range of prior art systems. The preferred range of conical angle lies between 15° and 25°. In this range, the range of the detector is substantially improved but additionally the width of the area of surveillance is substantially improved. When a more acute cone is used, the range is enhanced but the width of the area of surveillance is limited.

It is believed that the improved performance results from the optical gain of the system, that is to say the effective aperture of the system with the reflector is substantially greater than that of the transducer itself. The optical gain is of itself sufficient to render the transducer sensitive to the changes in incident infra-red radiation as an intruder moves within the area of surveillance, thereby rendering optical modulation of the system unnecessary. The absence of optical modulation of course eliminates the blind spots inherent in prior art systems. It is also believed that multiple reflections may contribute both to the sensitivity of the detector and the width of the area of surveillance. It should be stressed that the utility of the invention has been proved by experiment and should not be prejudiced by the correctness or otherwise of the above analysis of the method of operation.

Figure 2:
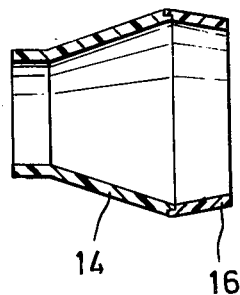
FIG. 2 is a view generally similar to FIG. 1 of a second embodiment of infra-red detectors in accordance with the invention.

The embodiment in FIG. 2 differs from that in FIG. 1 in that the end of the reflector remote from the transducer is divergent towards the pyro-electric transducer. In this case, the two frusto-conical sections 14, 16 of the reflector may be separately moulded and vacuum aluminized subsequently to be joined together, for example by an adhesive. The effect of the modified end of the reflector is to improve still further the width of the area of surveillance in the near field without having severe effects on the overall range of the detector.

I claim:

1. A detector for detecting electromagnetic radiation within the infra red region of the electromagnetic spectrum comprising a pryo-electric transducer positioned so as to intercept electromagnetic radiation focussed by a converging reflector system wherein said converging reflector system is at least partially frusto-conical including an extension added to said converging reflector system, said extension being divergent towards said pyro-electric device and positioned at the end of said converging reflector system furthest from said pyro-electric device.

* * * * *